L. PASSMORE.
Sad-Iron.
No. 196,763. Patented Nov. 6, 1877.
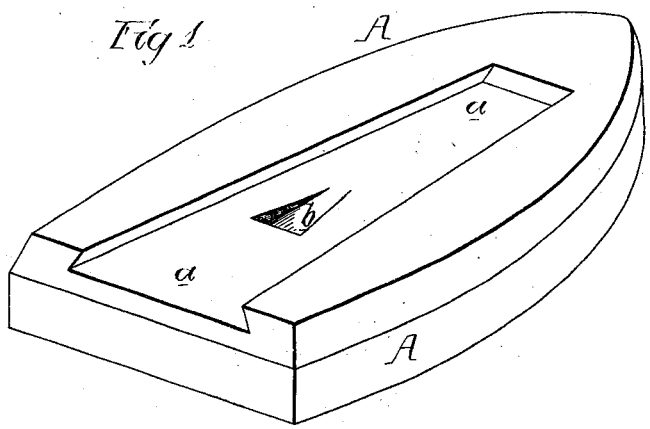
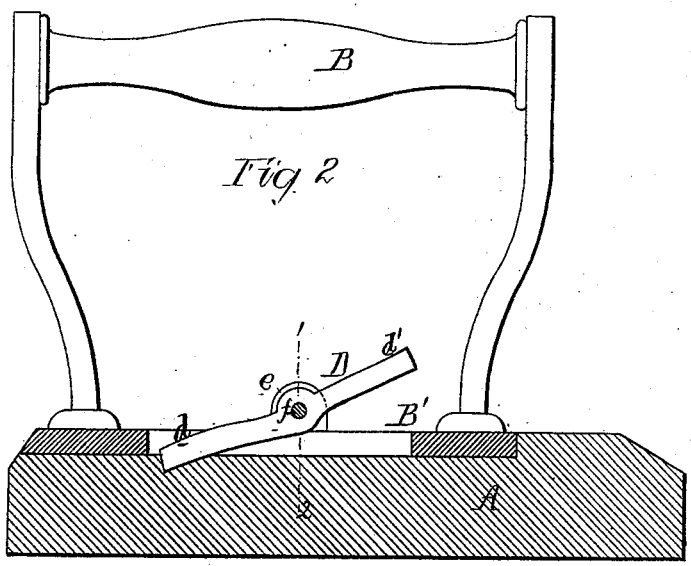
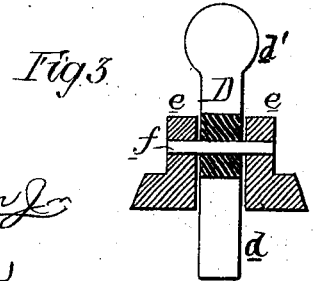
Witnesses
Henry Howson Jr
Harry Smith
Inventor
Lewis Passmore
by his Attorneys
Howson and Son

UNITED STATES PATENT OFFICE.

LEVIS PASSMORE, OF BRIDGEWATER, VIRGINIA.

IMPROVEMENT IN SAD-IRONS.

Specification forming part of Letters Patent No. 196,763, dated November 6, 1877; application filed May 21, 1877.

*To all whom it may concern:*

Be it known that I, LEVIS PASSMORE, of Bridgewater, Rockingham county, Virginia, have invented a new and useful Improvement in Sad-Irons, of which the following is a specification:

My invention relates to that class of sad-irons in which a detachable handle is dovetailed to the base and combined with a retaining device; and the object of my invention is to afford facilities for the ready detachment of the handle of a sad-iron from its base.

In the accompanying drawing, Figure 1 is a perspective of the base of my improved sad-iron; Fig. 2, a side view of the handle, with the base in section; and Fig. 3, a transverse section on the line 1 2, Fig. 2.

In the base A of the sad-iron, which may be of the usual form, is a dovetailed recess, $a$, of the tapering form shown in Fig. 1, the wide end of the recess extending to the rear end of the base, and the narrow end terminating at a short distance from the pointed front of the said base. In the bottom of the recess $a$ there is a smaller recess, $b$, for a purpose explained hereinafter.

The handle B is connected to a plate, B′, adapted to the dovetailed recess $a$ in the base. There is an opening in the plate B′ of the handle, for admitting the lower arm $d$ of the retaining-lever D, which is pivoted loosely by a pin, $f$, passing through lugs $e$ on the plate B′, this lower arm of the lever being slightly heavier than the upper arm $d'$, and having consequently a tendency to retain its position in the recess $b$ of the base, and to lock the handle to the latter, until it is released therefrom by depressing the upper arm. This upper arm of the lever projects upward and forward, to be within reach of the forefinger of the hand which grasps the handle, so that without any change in the position of the hand as regards the handle, the upper arm of the lever can be depressed and the handle released from the base without any other effort than that of simply extending the said finger.

I do not desire to claim either a sad-iron with a detachable handle fitted with a dovetail to the base, or the combination of the same with a retaining device; but

I claim as my invention—

In a sad-iron having a detachable handle fitted with a dovetail to the base, the combination of a recess, $b$, in the base with a lever, D, pivoted loosely to the plate B′ of the handle, and having a lower arm adapted to the said recess, and an upper and lighter arm projecting forward and upward, all substantially as set forth.

In testimony whereof I have signed my name to this specification in the presence of two subscribing witnesses.

LEVIS PASSMORE.

Witnesses:
HERMANN MOESSNER,
HARRY SMITH.